United States Patent
Nakajima

(10) Patent No.: US 8,280,195 B2
(45) Date of Patent: Oct. 2, 2012

(54) VIDEO DATA INDEXING SYSTEM, VIDEO DATA INDEXING METHOD AND PROGRAM

(75) Inventor: Noboru Nakajima, Tokyo (JP)

(73) Assignee: Nec Corporation, Tokyo (JP)

( * ) Notice: Subject to any disclaimer, the term of this patent is extended or adjusted under 35 U.S.C. 154(b) by 960 days.

(21) Appl. No.: 12/294,220

(22) PCT Filed: Mar. 26, 2007

(86) PCT No.: PCT/JP2007/056206
§ 371 (c)(1),
(2), (4) Date: Sep. 23, 2008

(87) PCT Pub. No.: WO2007/111297
PCT Pub. Date: Oct. 4, 2007

(65) Prior Publication Data
US 2009/0148047 A1 Jun. 11, 2009

(30) Foreign Application Priority Data
Mar. 24, 2006 (JP) ................................ 2006-083385

(51) Int. Cl.
G06K 9/54 (2006.01)
(52) U.S. Cl. ........ 382/305; 382/195; 382/154; 382/219; 382/225; 382/181; 707/3; 707/104.1; 707/6
(58) Field of Classification Search .................. 382/305, 382/195, 154, 219, 225, 181; 707/3, 6, 104.1
See application file for complete search history.

(56) References Cited

U.S. PATENT DOCUMENTS

| 6,580,437 B1 | 6/2003 | Liou et al. | |
|---|---|---|---|
| 2005/0267879 A1* | 12/2005 | Sekiguchi et al. | 707/3 |
| 2007/0237426 A1* | 10/2007 | Xie et al. | 382/305 |

FOREIGN PATENT DOCUMENTS

| JP | 10289241 A | 10/1998 |
|---|---|---|
| JP | 11066107 A | 3/1999 |
| JP | 11-167583 A | 6/1999 |
| JP | 2001243236 | 9/2001 |
| JP | 2001268657 A | 9/2001 |

(Continued)

OTHER PUBLICATIONS

Communication dated Dec. 2, 2012, issued by the Japanese Patent Office in corresponding Japanese Patent Application No. 2008-507487.

(Continued)

*Primary Examiner* — Mike Rahmjoo
(74) *Attorney, Agent, or Firm* — Sughrue Mion, PLLC

(57) ABSTRACT

[Problem] To reduce omission of searched results and improve search efficiency in indexing by means of telop and another text information attached to a video.
[Solving Means] A video indexing system has an index generating unit which generate an index, an index accumulating unit which accumulates the index together with attached information such as an index position, an image feature generating unit which generates an image feature, an image feature accumulating unit which accumulates the image feature together with the attached information such as the position, and an image feature checking unit which compares the image feature with past image features, and, when matched, outputs the index at the time of outputting the corresponding past image feature as a current index.

16 Claims, 9 Drawing Sheets

FOREIGN PATENT DOCUMENTS

| | | | |
|---|---|---|---|
| JP | 2001-357045 | A | 12/2001 |
| JP | 2002132782 | A | 5/2002 |
| JP | 3621323 | B2 | 11/2004 |
| WO | 2005004159 | A1 | 1/2005 |

OTHER PUBLICATIONS

Extended European Search Report Issued on May 11, 2012 in corresponding European Application No. 07739644.

Yihong Gong, et al, Generating Optimal Video Summaries, Jul. 30, 2000, pp. 1559-1562, vol. 3, Multimedia and Expo, 2000.US.

* cited by examiner

VIDEO DATA INDEXING SYSTEM, VIDEO DATA INDEXING METHOD AND PROGRAM

TECHNICAL FIELD

The present invention relates to indexing of video data and particularly, relates to a video data indexing system, video data indexing method and program which can access to a desired portion of video data efficiently.

BACKGROUND ART

One example of a conventional indexing method for storage, display and search of video data is described in Patent Document 1. With this conventional method, a determination is made whether telop characters are displayed for each frame of input video data, a character area is extracted from the frame whose telop characters are displayed so that a process for recognizing the telop characters is executed. Further, an index file which includes the recognized result of the telop characters and ID information at the time of displaying the telop characters is generated. The ID information is ID information at the time of inputting the frame to be recognized. Further, the Patent Document 1 discloses that the ID information is occasionally the input time information of the frame.

Patent Document 1: Japanese Patent Application Laid-Open No. 11-167583 (JP-A 11-167583) (paragraph 0002 and FIG. 2)

DISCLOSURE OF THE INVENTION

Problem to be Solved by the Invention

Text information including closed caption and telop attached to or embedded into video data is useful for relating text indexes to video data, and when the index generated in such a manner is used, thereby enabling search of video data by query of text. However, since the text information is not always linked with a video and is not always present, omission occasionally occurs in a searched result. For example, in most cases, telop is superimposed on a person or a scene only for a few seconds for which a corresponding object is firstly displayed. Therefore, text information is present in some of a plurality of frame images on which the same video is displayed, but text information is not present in the other of the frame images. Further, when telop characters have italic face or characters and background are displayed in an inverted manner, text information is occasionally recognized falsely.

[Object of the Invention]

It is an object of the present invention to give an index of text to vide data which does not include text information, based on information about frequency of simultaneous appearance of a scene and text information on a vide and consequently, to reduce omission at the time of searching video data.

Means to Solve the Problem

A video data indexing system of the present invention, which includes:

an index generating unit which generates an index from inputted video data;

an index accumulating unit which accumulates the index;

an image feature generating unit which generates an image feature from the inputted video data;

an image feature accumulating unit which accumulates the image feature; and an image feature checking unit which, when the image feature generating unit generates the image feature from the video data, searches the image feature accumulating unit for an image feature which is matched with or similar to the generated image feature, acquires an index of video data corresponding to the searched image feature from the index accumulating unit, adds the acquired index to the index of the inputted video data, and accumulates the index of the inputted video data which the acquired index is added, as the index of the inputted video data, in the index accumulating unit.

A video data indexing system of the present invention, which includes:

an index generating unit which generates an index from inputted video data;

an index accumulating unit which accumulates the index;

an image feature generating unit which generates an image feature from the inputted video data;

an image feature accumulating unit which accumulates the image feature; and an image feature checking unit which, when the image feature generating unit generates the image feature from the video data, searches the image feature accumulating unit for an image feature which is matched with or similar to the generated image feature, acquires an index of video data corresponding to the searched image feature from the index accumulating unit, adds the index of the inputted video data to the acquired index, and accumulates the acquired index which the index of the inputted video data is added, as the index of the video data corresponding to the searched image feature, in the index accumulating unit.

A video data indexing method of the present invention, which includes:

an index generating step of generating an index from inputted video data;

a first index accumulating step of accumulating the index;

an image feature generating step of generating an image feature from the inputted video data;

an image feature accumulating step of accumulating the image feature;

an image feature checking step of, when the image feature is generated from the video data, searching an image feature matched with or similar to the generated image feature from image features accumulated at the image feature accumulating step, and acquiring an index of video data corresponding to the searched image feature; and a second index accumulating step of adding the acquired index to the index of the inputted video data and accumulating the index of the inputted video data which the acquired index is added, as the index of the inputted video data.

A video data indexing method of the present invention, which includes:

an index generating step of generating an index from inputted video data;

a first index accumulating step of accumulating the index;

an image feature generating step of generating an image feature from the inputted video data;

an image feature accumulating step of accumulating the image feature;

an image feature checking step of, when the image feature is generated from the video data, searching an image feature matched with or similar to the generated image feature from image features accumulated at the image feature accumulating step, and acquiring an index of video data corresponding to the searched image feature; and a second index accumulating step of adding the index of the inputted video data to the acquired index and accumulating the acquired index which the index of the inputted video data is added, as the index of the video data corresponding to the searched image feature.

A video data indexing program of the present invention allows a computer to function as:

an index generating unit which generates an index from inputted video data;

an index accumulating unit which accumulates the index;

an image feature generating unit which generates an image feature from the inputted video data;

an image feature accumulating unit which accumulates the image feature; and an image feature checking unit which, when the image feature generating unit generates the image feature from the video data, searches the image feature accumulating unit for an image feature which is matched with or similar to the generated image feature, acquires an index of video data corresponding to the searched image feature from the index accumulating unit, and adds the acquired index to the index of the inputted video data, and accumulates the index of the inputted video data which the acquired index is added, as the index of the inputted video data, in the index accumulating unit.

A video data indexing program of the present invention allows a computer to function as:

an index generating unit which generates an index from inputted video data;

an index accumulating unit which accumulates the index;

an image feature generating unit which generates an image feature from the inputted video data;

an image feature accumulating unit which accumulates the image feature; and an image feature checking unit which, when the image feature generating unit generates the image feature from the video data, searches the image feature accumulating unit for an image feature which is matched with or similar to the generated image feature, acquires an index of video data corresponding to the searched image feature from the index accumulating unit, adds the index of the inputted video data to the acquired index, and accumulates the acquired index which the index of the inputted video data is added, as the index of the video data corresponding to the searched image feature, in the index accumulating unit.

EFFECT OF THE INVENTION

According to the present invention, an index can be given to video data which does not have information appropriate as an index and also in the case where extraction of an index is failed, so that omission of video data search can be reduced. This is because an index is supplemented to video data having no information appropriate as an index such as characters from video data having an index based on matching or similarity between a plurality of scenes in a video, and thus the omission of the search can be eliminated. At the time of the search, an index and a keyword may be checked regardless of the supplements.

DESCRIPTION OF REFERENCE SYMBOLS

Figure 1:
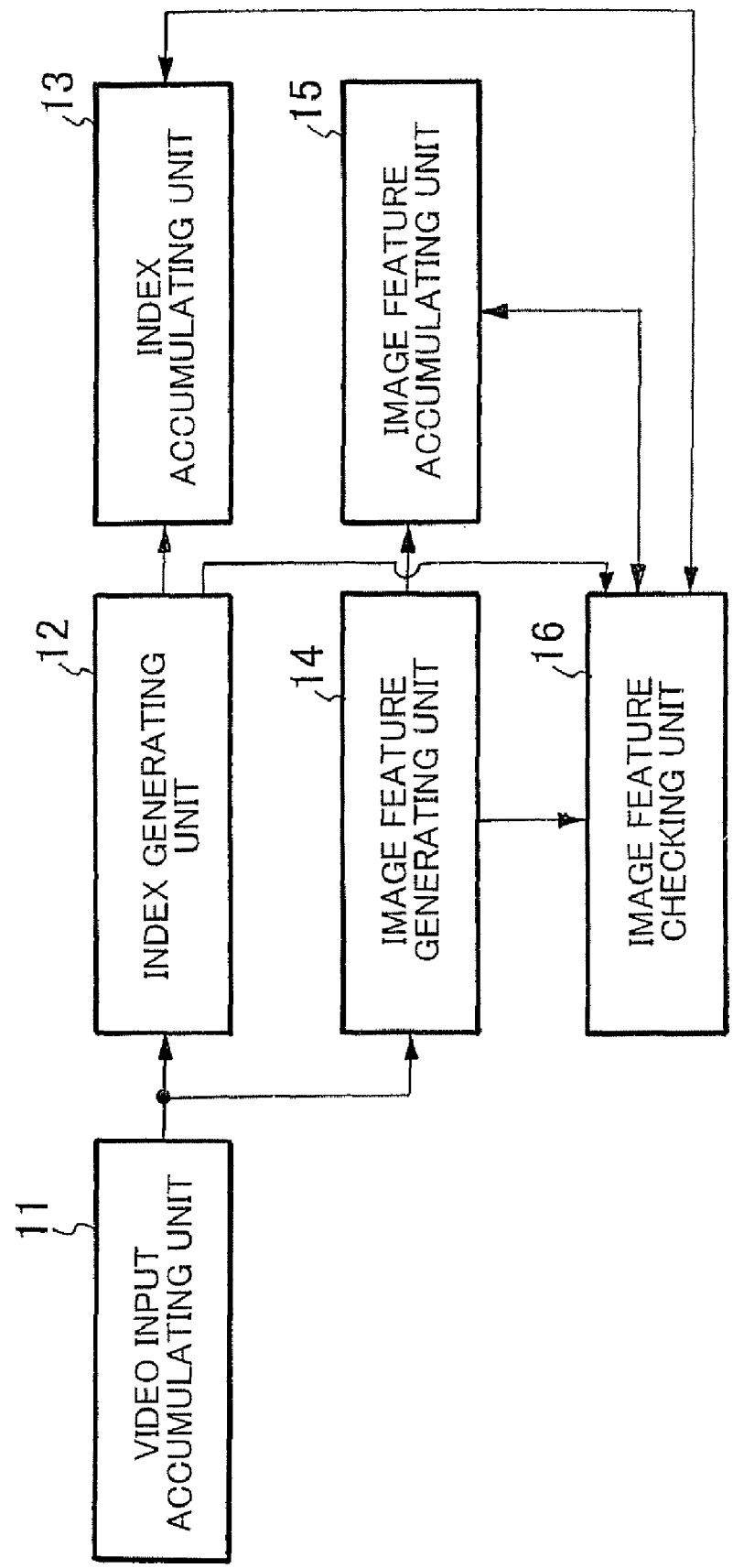
FIG. 1 is a block diagram illustrating a constitution according to a best mode for embodying the first invention.

11: video input accumulating unit
12: index generating unit
13: index accumulating unit
14: image feature generating unit
15: image feature accumulating unit
16: image feature checking unit
17: ambiguous index generating unit
18: query converting unit

BEST MODE FOR CARRYING OUT THE INVENTION

A best mode for embodying the present invention is described in detail below with reference to the drawings.

FIG. 1 is a block diagram illustrating a video data indexing system according to a first embodiment of the present invention.

As shown in FIG. 1, the video data indexing system according to the first embodiment has a video input accumulating unit 11, an index generating unit 12, an index accumulating unit 13, an image feature generating unit 14, an image feature accumulating unit 15, and an image feature checking unit 16.

The video input accumulating unit 11 inputs and accumulates any video data as digitalized frame images.

Figure 4:
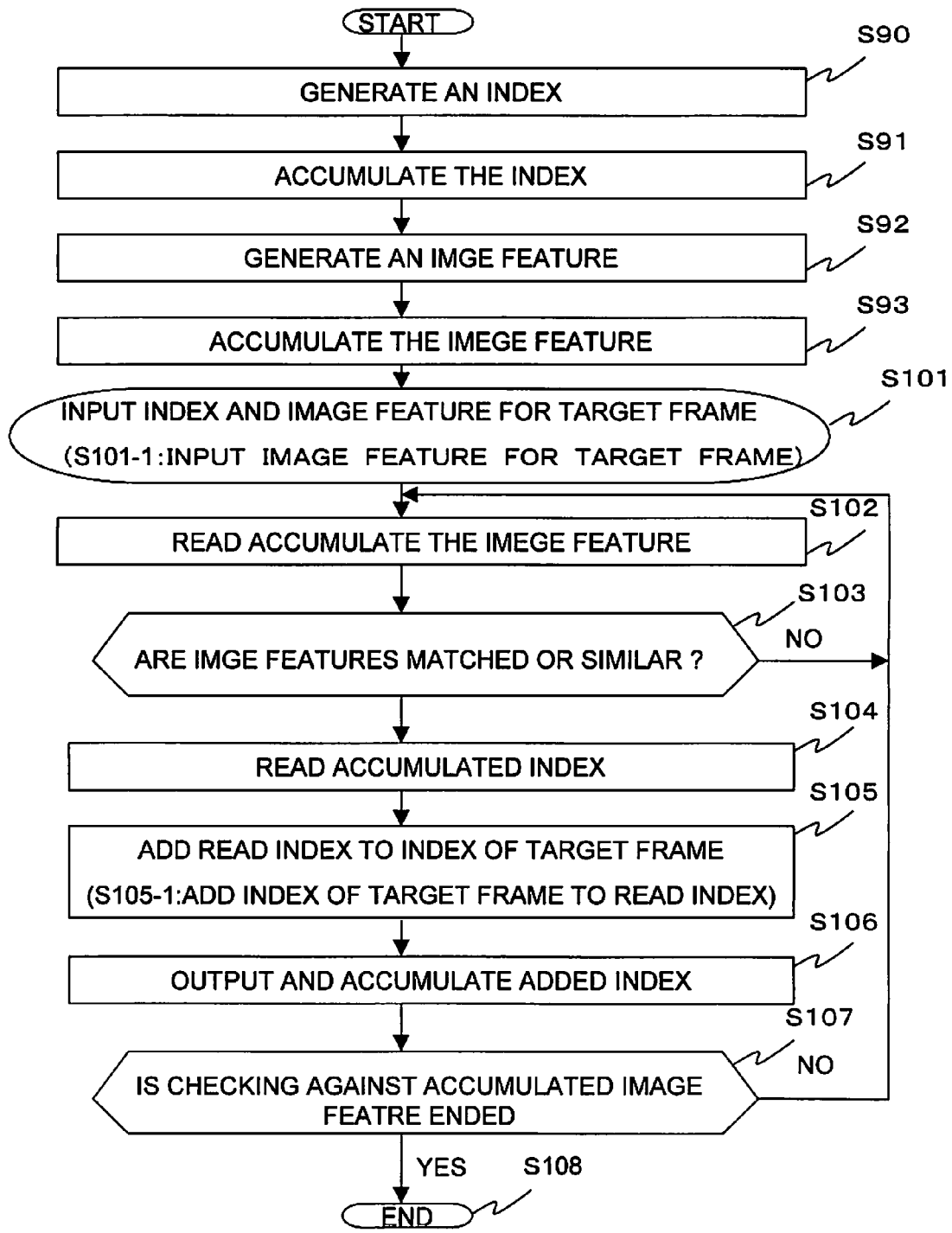
FIG. 4 is a flow chart illustrating one example of an operation of an image feature checking unit according to the best mode for embodying the first invention of the present invention.

The index generating unit 12 acquires a frame image from the video input unit 11, and detects a character string from text information including closed caption and telop in the video data and includes the character string in an index so as to output the index and the frame image which are related to each other (step S90 in FIG. 4). The index may include detected time and position of the character string as character string position information. Further, the index generating unit may generate an index according to electronic program list, closed caption, data broadcasting sound recognition, telop recognition, and object recognition.

Concretely, one example of a procedure for extracting a character string from a frame image is described. A frame image is differentiated, so that a differentiated image is generated. Pixels values of the differentiated image are binarized by a predetermined threshold, and the obtained binarized image is projected in horizontal and vertical directions and a histogram relating to pixels is generated so that a projection pattern is obtained. A continuous region where the projection pattern has a predetermined value or more is a character region candidate. At this time, a continuous region whose size is less than a predetermined value may be excluded as a noise from the character region candidate. A layout analysis is applied to the respective candidate regions, so that final character string position information is generated.

As a layout analyzing process, for example, "Document layout analysis by extended split detection method" by N. Nakajima and K. Yamada described on pages 406 to 415 in pre-proceedings of IAPR workshop on Document analysis systems, 1998 may be used. With this method, an image region other than characters is extracted and is divided into partial regions by using their position of the image region as boundaries. This method is recursively applied to the partial regions, so that a character string position is finally detected. The character string position may be a rectangle which minimally surrounds one character string.

The index generating unit 12 may generate character string position information by applying the layout analysis to the character string candidate region. Since a lot of noises other than characters are excessively extracted from a background, the noises are expected to be included in the character string candidate region, but with the above method, these noises are erased as regions other than character strings during the recursive process, and only the character string is extracted.

Further, the index generating unit 12 recognizes character strings in the inside of the extracted character strings.

One example of the character recognition using the index generating unit 12 is described. An image corresponding to a character string position is cut out so as to be a character string image. The character string image is labeled so that a plurality of connected component aggregates is obtained. At this time, when it is assumed that characters contact with each other and the size of the connected component is not less than a predetermined value, pixels of the connected component are projected onto a long side of a corresponding minimum direction rectangle, and the connected component is divided by its minimum value and the connected component is removed from the connected component aggregate, so that the connected component is replaced by the divided connected components. The connected components are adjacently integrated so that a character image candidate is generated (FIG. 1).

Figure 3:
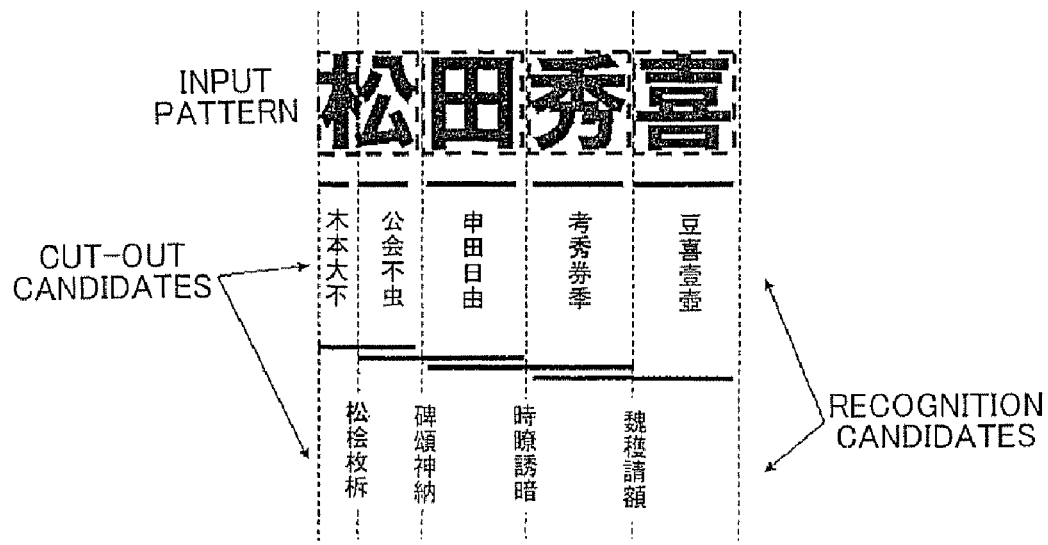
FIG. 3 is a conceptual diagram illustrating an example of an ambiguous (vague) index.
Figure 7:
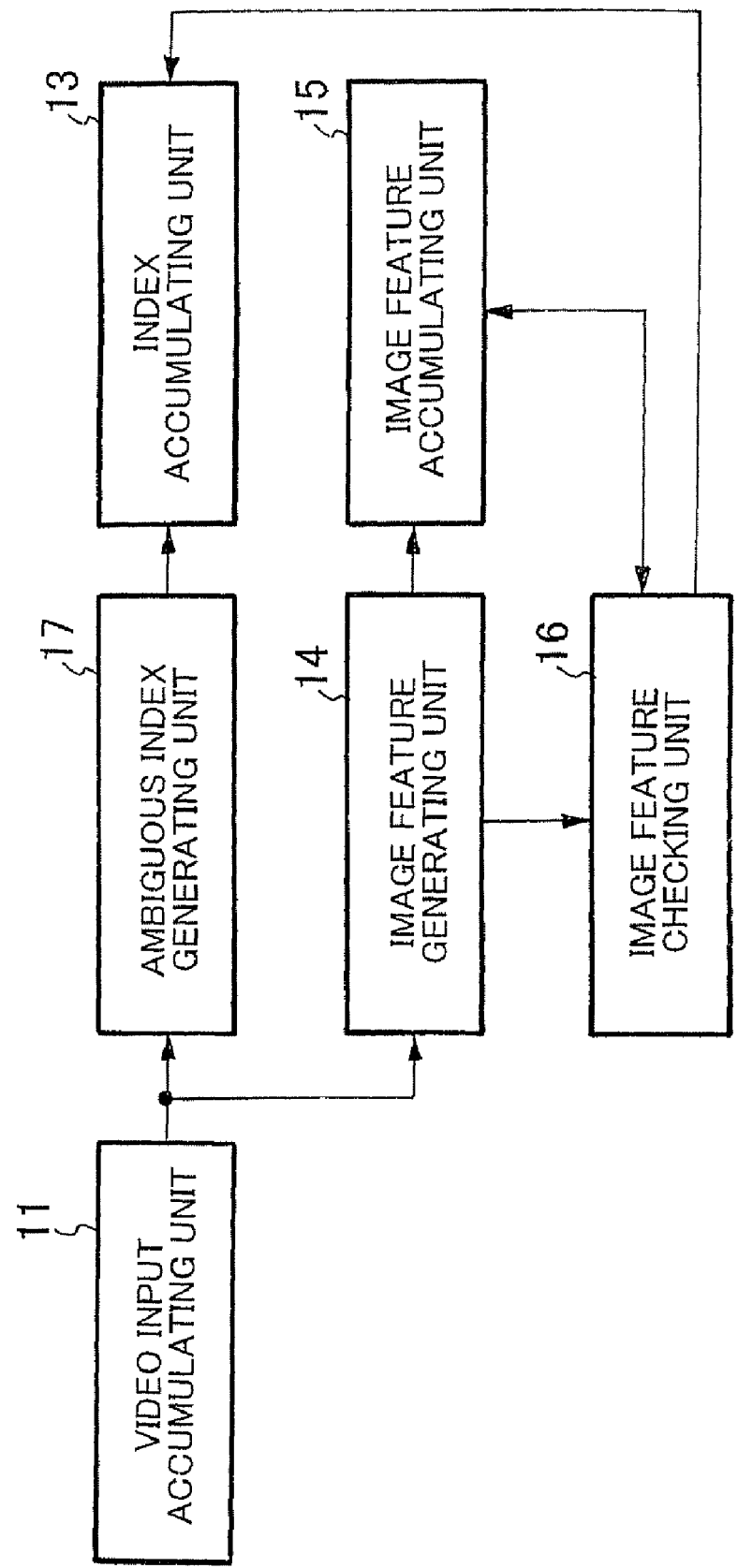
FIG. 7 is a block diagram illustrating one example of a constitution according to the best mode for embodying the first invention of the present invention.

At this time, when a method for integrating patterns corresponding to the connected components has an ambiguity (vagueness), only one character image integrating method is not defined, but as shown in FIG. 3, a plurality of integrating methods is recorded so as to be cut-out candidates. Characters of all the cut-out candidates may be recognized so as to be converted into text codes (FIG. 7). In this case, as shown in FIG. 7, the index generating unit 12 in FIG. 1 is replaced by an ambiguous index generating unit 17 in FIG. 7.

The character recognition is carried out by matching with character recognition dictionary (not shown), which is generated in advance. The character recognition dictionary is a database where the character image patterns are related to the text codes.

When a character type cannot be uniquely defined for the character recognition, the text code is not narrowed down to only one at this time, and a plurality of character recognition candidates is retained (see FIG. 3). The index generating unit 12 may associate cyclopedic combinations of the cut-out candidates and the recognition candidates corresponding to the character string image generated, with corresponding frame images, and output them as ambiguous (vague) indexes to the index accumulating unit 12.

In an example of FIG. 3, left-hand radicals and right-hand radicals of Chinese characters are separated, integrated two connected components are cut-out candidates, and most likely four text codes in text codes as results of character-recognizing the cut-out candidates are retained.

An ambiguous index is composed of text codes which the number is obtained by (the number of the cut-out candidates)×(the number of the recognition candidates). Position coordinate in the frame of each of the cut-out candidates may be retained in the ambiguous index. Thereafter, an index is used commonly for the case where the index has ambiguity (FIG. 7) and the case where an index has no ambiguity unless otherwise noted.

The index accumulating unit 13 accumulates indexes output from the index generating unit 12 (step S91 in FIG. 4).

The image feature generating unit 14 extracts graphical image features from the frame image acquired from the video input unit 11 in order to match scenes and objects between frame images (step S92 in FIG. 4). The image feature may be a low resolution image acquired by sampling an image into a prescribed size or may be obtained by a method compliant with ISO IEC JTC1SC29 WG11 MPEG 7 (Moving Picture Experts Group). When checking matching of persons, a method described in "Eigenfaces for recognition" by M. Turk and A. Pentland on pages 71 to 86 in Journal of Cognitive Neuroscience 3(1), 1991 may be used. Further, when an object present in any position in a video data is checked, the object is extracted by using a method described in "Pictorial Structure for Object Recognition" by D. Huttenlocher, P. Felzenszwalb on pages 55 to 79 in International Journal of Computer Vision, 61(1), 2005, and an image feature given only to the target object is used so that frames are checked. The image feature is output to the image feature accumulating unit 15 and is related to a corresponding frame image so as to be stored (step S93 in FIG. 4). The image feature accumulating unit 15 may accumulate the generated image feature together with corresponding information including video data time and position.

The image feature checking unit 16 sequentially acquires indexes output from the index generating unit 12 and image features output from the image feature generating unit 14, and checks the image features against the image features accumulated in the image feature accumulating unit 15. When image features where similarity of more than a predetermined value is recognized is detected (the image features are matched or similar), a corresponding index accumulated in the index accumulating unit 13 is read and is added to a current index so as to be output to the index accumulating unit 13 (FIG. 4). The matching and similarity can be measured by obtaining an Euclidean distance between image features, for example.

An operation is described below.

FIG. 4 is a flow chart illustrating an example of processing steps in the image feature checking unit of the video data indexing system according to the first embodiment. Indexes or image features are supposed to be accumulated to a certain extent in the index accumulating unit 13 and the image feature accumulating unit 15.

When video data is accumulated in the video input accumulating unit 11, the index generating unit 12 acquires a frame image so as to output an index. Similarly, the image feature generating unit 14 acquires a frame image so as to output an image feature. The index and the image feature may be output sequentially or in parallel.

When the index and the image feature are output from the index generating unit 12 and the image feature generating unit 14, respectively, the index and the image feature are input into the image feature checking unit 16 (step S101).

The image feature checking unit 16 reads an image feature accumulated in the image feature accumulating unit 15 (step S102), and checks if the read image feature is matched with or is similar to the input image feature (step S103). When the image features are not matched or are not similar, a next image feature is read from the image feature accumulating unit 15 (step S102).

When the image features are matched or are similar, the image feature checking unit 16 acquires a frame number which is related to the image feature from the image feature accumulating unit 15, and reads a corresponding index from the index accumulating unit 13 based on the frame number (step S104). The read index is added to the input index (step S101), and the added index is output (step S106). The index accumulating unit 13 relates the index output from the image feature checking unit 16 to the input frame image so as to accumulate the index.

The image feature checking unit 16 checks if the checking of the input image feature against the accumulated image feature is ended (step S107), and steps S102 to S106 are executed until the checking is ended. When the checking is ended, the process is ended (step S108).

The description refers to that the index and the image feature are input into the image feature checking unit 16, but only an image feature generated from video data may be input into the image feature checking unit 16. In this case, the output from the index generating unit 12 is not input into the image feature checking unit in FIG. 1 but is output only to the index accumulating unit 13 (the constitution shown in FIGS. 8 and 9, described later). Further, steps S101 and S105 in the flow chart of FIG. 4 change to steps S101-1 and S105-1. At step S101-1, only an image feature generated from video data is input into the image feature checking unit 16. Steps S102, S103 and S104 are not changed. At step S105-1, an index read at step S104 is added to another index which is read from the index accumulating unit 13 and is generated from the video data. Subsequent steps S106 to S108 thereafter are not changed.

The description refers to that the read index is added to the input index in the image feature checking unit 16 (step S105), but the input index may be added to the read index. That is to say, an index which is added to the input index is not accumulated in the index accumulating unit, but the input index may be added to the read index so as to be accumulated in the index accumulating unit. In this case, an index of new input video data is accumulated directly in the index accumulating unit, and the index of the new input video data is added to the indexes which is already accumulated in the index accumulating unit.

In a flow chart at the time when the input index is added to the read index, step 105 in FIG. 4 changes to step 105-1. Steps S101 to S104 are not changed. At step S105-1, the index input at step S101 is added to the index read at step S104. Subsequent steps S106 to S108 are not changed.

A number of corresponding indexes to be read from the index accumulating unit 13 at step 104 increases according to sequential input of video data into the video data indexing system. For example, it is assumed that two same or similar frame images are present, and their indexes are denoted by d2 and (d1, d2) and are accumulated in the index accumulating unit 13. The index (d1, d2) represents an index obtained by adding the index d2 to the index d1. When the input index is denoted by d3 and an image feature of video data (frame image) relating to the index d3 is the same as or similar to the above two frame images, the two indexes d2 and (d1, d2) are read. The indexes d2 and (d1, d2) are added to the index d3 so that an index (d1, d2, d3) is obtained, and this is accumulated in the index accumulating unit 13. When a next input index is denoted by d4 and an image feature of video data relating to the index d4 is the same as or similar to the above three frame images, the three indexes d2, (d1, d2) and (d1, d2, d3) are read similarly.

Figure 5:
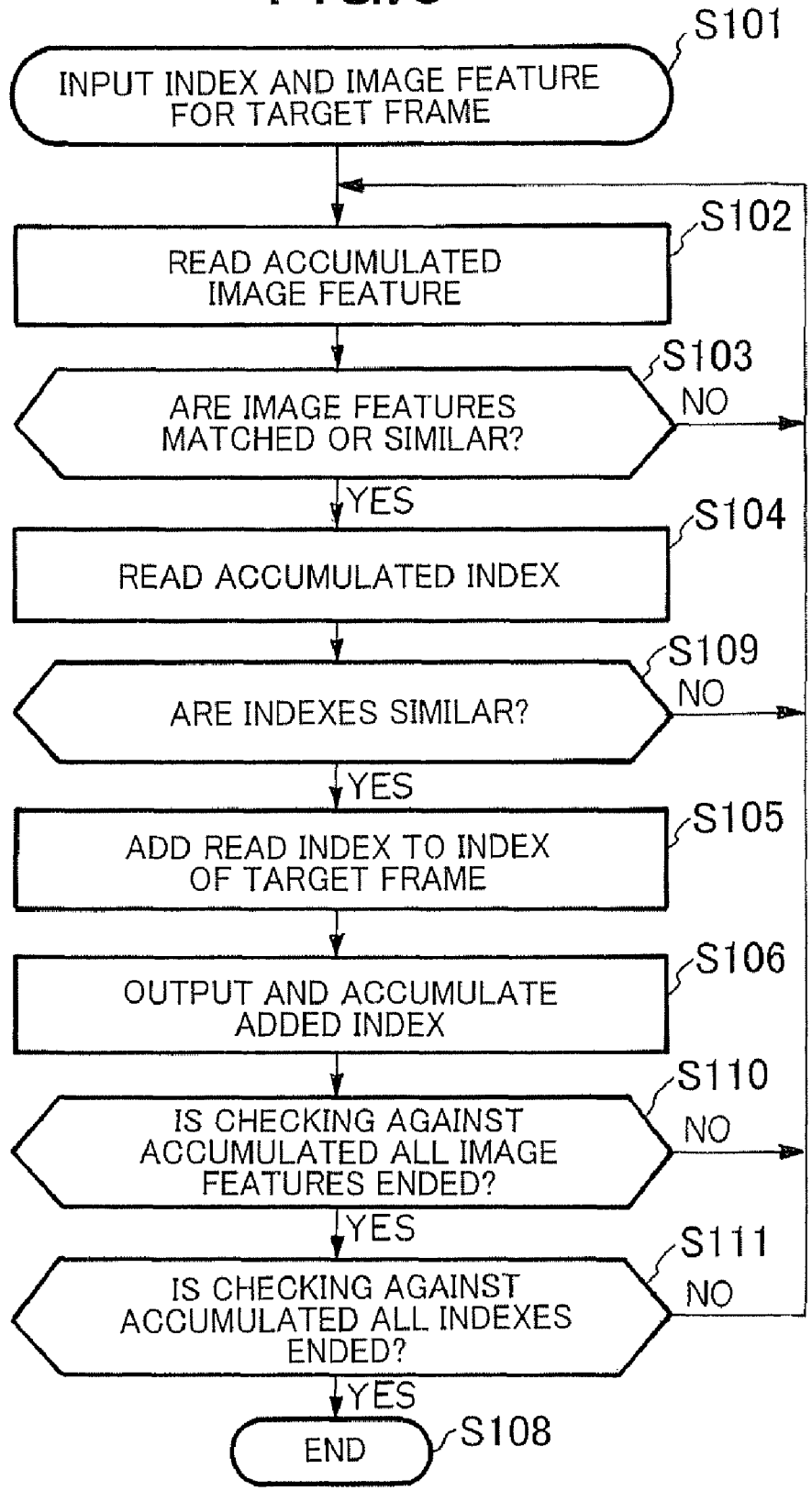
FIG. 5 is a flow chart illustrating one example of an operation of the image feature checking unit according to the best mode for embodying the first invention of the present invention.

Another example of the operation is described below. FIG. 5 is a flow chart illustrating another example of processing steps of the video data indexing system according to the first embodiment. Like processing steps are denoted by like reference numerals in FIG. 4, and description thereof is omitted.

As shown in FIG. 5, when an index is added, the index may be added under a condition that the accumulated indexes are similar to an index output from a current frame, and when they are matched with each other, the index may not be added. The matching between indexes can be determined by a degree of matching between recognition candidates included in indexes, and for example, when a number of matched characters exceeds a predetermined threshold, the indexes may be matched with each other. As a result, redundant copying of indexes can be reduced. The flowchart in FIG. 5 does not show the case where indexes are not similar, an index is added similarly to the case where indexes are similar.

In this example, the image feature checking unit 16 reads an index at step S104, and checks if the read index is similar to the input index (step S109). When similar, the image feature checking unit 16 adds the read index to the input index so as to output it to the index accumulating unit 13. When the process is ended, the image feature checking unit 16 checks if accumulated indexes which are not checked are present (step S111).

In such a modification, when indexes are similar, character information may be matched based on the similarity of the indexes. According to such an aspect, accuracy of indexes can be improved. Because the accuracy of character recognition is more stable than recognition of video scene, but it is not 100%.

Figure 6:
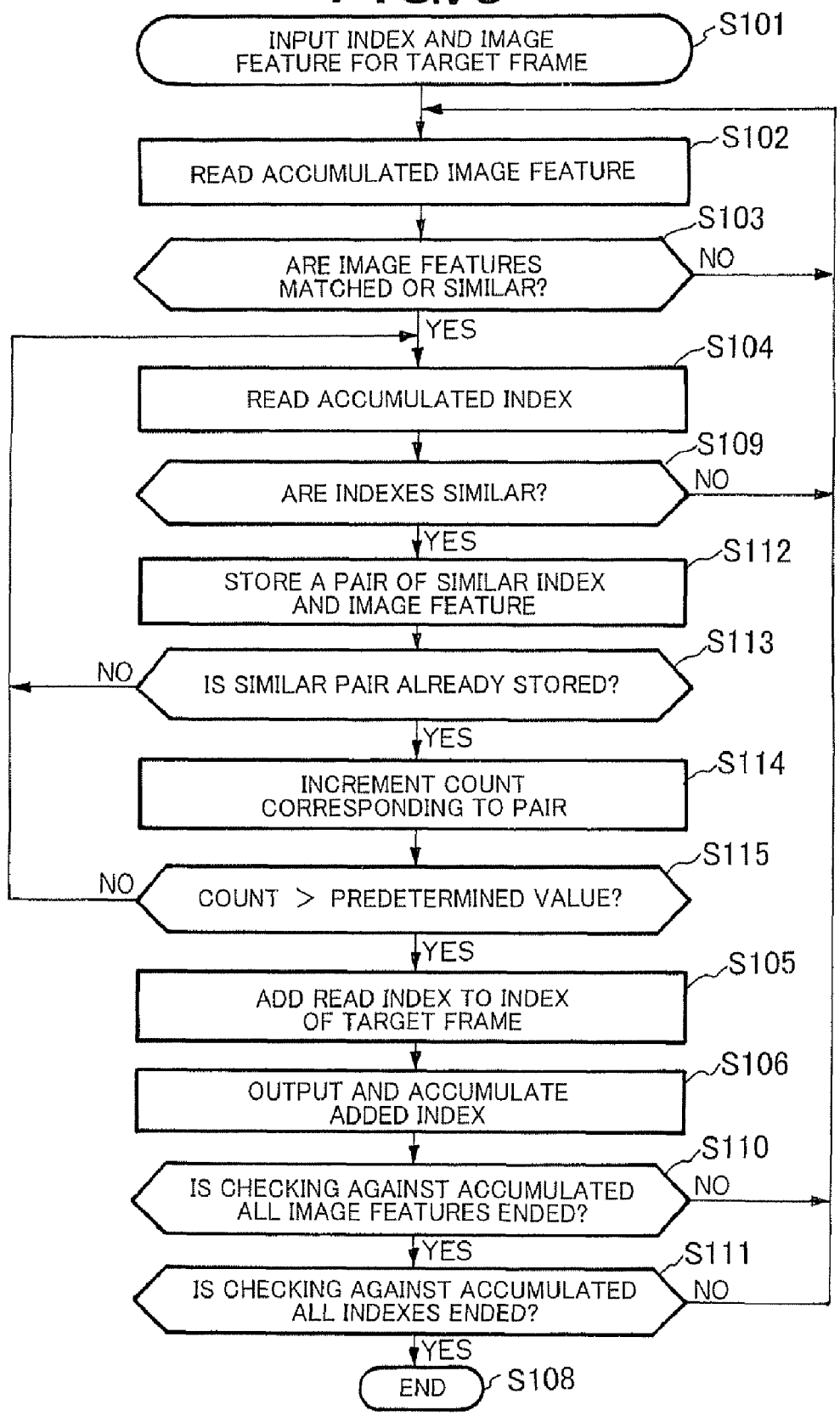
FIG. 6 is a flow chart illustrating one example of an operation of the image feature checking unit according to the best mode for embodying the first invention of the present invention.

Still another example of the operation is described below. FIG. 6 is a flow chart illustrating another example of the process steps of the video data indexing system according to the first embodiment. Like processing steps are denote by like reference numerals in FIGS. 4 and 5, and the description thereof is omitted.

As shown in FIG. 6, image features are similar or matched, the number of index similarity times is stored, and copying of an index does not have to be executed until the number of times exceeds a predetermined value. As a result, a co-occurrence relation between the image feature and the index can be measured more accurately, and reliability of an index can be improved.

In this example, the image feature checking unit 16 checks if indexes are similar at step S109, and counts and stores a pair of the similar index and the image feature together (step S112). The image feature checking unit 16 checks if the pair of the similar index and the image feature is already stored (step S113), and when the pair is not stored, it repeats reading of an index (return to step S104). When already stored, the image feature checking unit 16 increments the count corresponding to the pair (step S114), and compares the incremented count with a predetermined value (step S115). When the count is not more than the predetermined value, it repeats reading of an index (return to step S104). When the count exceeds the predetermined value, the image feature checking unit 16 recognizes the co-occurrence relation between the image feature and the index and executes the process for adding the index.

An effect of the first embodiment is described below.

Figure 2:
FIG. 2 is a pattern diagram illustrating a problem of a conventional invention.

In the first embodiment, since an index is copied from video data whose image features are matched or similar and is added to the target video data, even when the target video data does not include information appropriate as the index, the index can be added. For example, as shown in FIG. 2, when text information is present in some of a plurality of frame images where the same video is displayed and text information is not present in the other frame images, indexes can be added to the frame images which do not have text information. When telop characters are italic face or the characters and background are displayed in an inverted manner, even if an error occurs in text information, the same index can be added as long as the image features are similar.

In an aspect in which an index has ambiguity (vagueness), when a search keyword is given as a text at the time of search, all recognition candidates can be checked cyclopaedically, and ambiguous indexes can be used for text search. As a result, an influence of false recognition of characters due to a deterioration in search accuracy can be reduced. Therefore, an efficiency for selecting a desired scene can be further improved.

A second embodiment of the present invention is descried in detail below with reference to the drawings.

The video data indexing system according to the second embodiment of the present invention presents video data related to the matched indexes to a user according to a query of a text input by the user. Therefore, the video data indexing system according to the second embodiment can be called also as a video data searching system.

Figure 8:
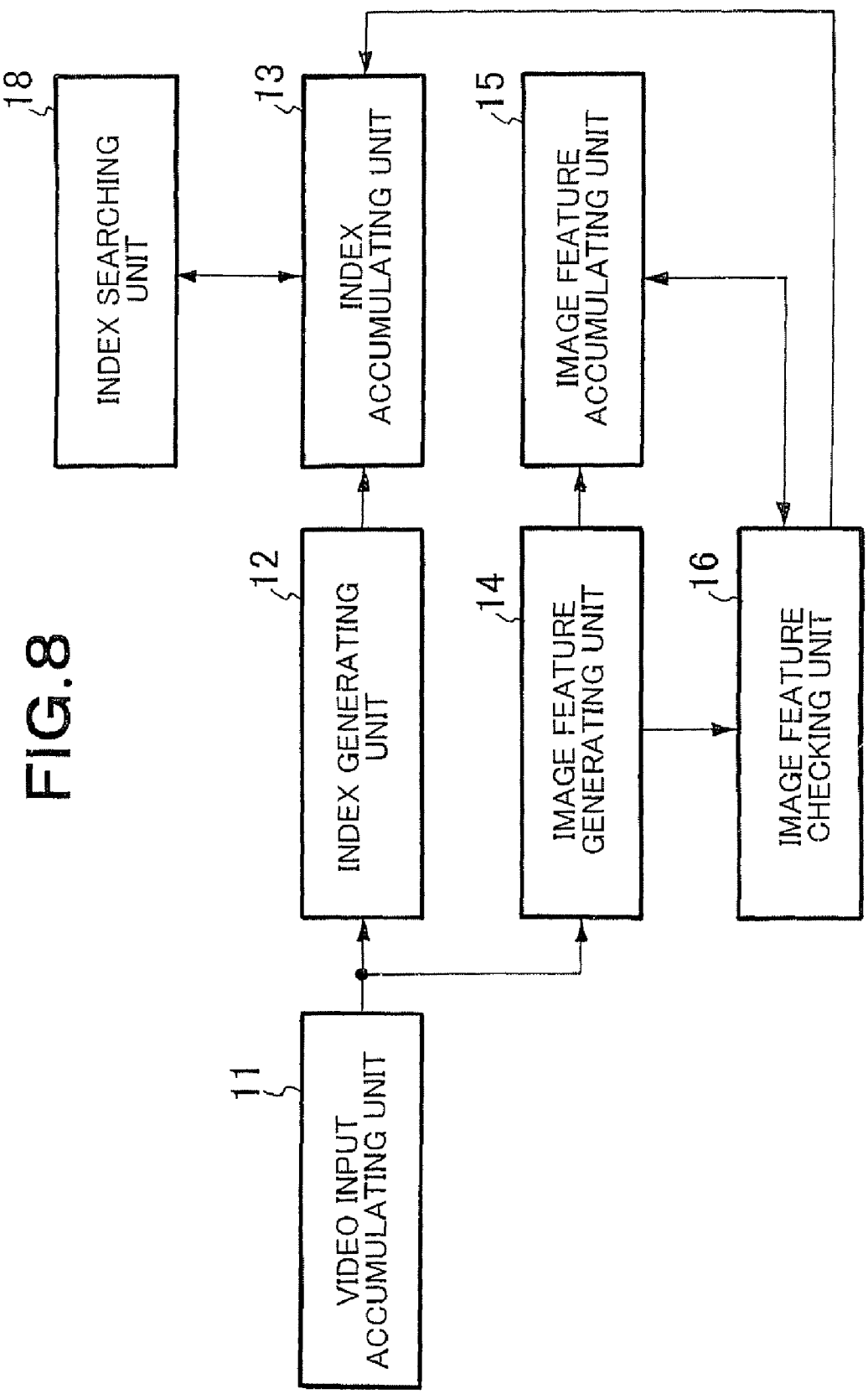
FIG. 8 is another block diagram illustrating the constitution according to the best mode for embodying a second invention of the present invention.

FIG. 8 is a block diagram illustrating the video data indexing system according to the second embodiment of the present invention. Components similar to those in the first embodiment are denoted by the same reference numerals, and the description thereabout is omitted. As shown in FIG. 8, the video data indexing system according to the second embodiment has the video input accumulating unit 01, the index generating unit 12, the index accumulating unit 13, the image feature generating unit 14, the image feature accumulating unit 15, the image feature checking unit 16 and a index searching unit 18.

That is to say, the second embodiment of the present invention is characterized by including an index searching unit 18 which inputs a query of a text from a user, checks the input query against accumulated indexes accumulated in the index accumulating unit 13 or ambiguous indexes (the index generating unit 12 in FIG. 8 can be replaced by the ambiguous index generating unit 17 in FIG. 7), and takes out video data series after a frame whose times corresponding to the matched indexes are matched or frame images whose times are matched from the video input accumulating unit 11 so as to present them to the user.

The index searching unit 18 receives the query of the text from the user by means of a unit, not shown, and checks the query against index aggregate accumulated in the index accumulating unit 13. When they are matched, the matching is posted. Time corresponding to the matched index may be displayed or the frame image may be read from the video accumulating unit 11 so as to be displayed. As to the matching of the index, the query may be regarded as being matched with the index when a ratio of a matching number of the recognition candidates in FIG. 3 and the characters of the query to the number of the characters of the query exceeds a predetermined value, or the number of matched characters may be counted so that a right-handed radical "公" of "松" and recognition candidate "裡" corresponding to cut-out candidates of combined "公" and "甲" are not simultaneously matched, namely, positional incoherence does not occur. A certainty factor of recognition (or distance value) is simultaneously retained in the recognition candidate, and a sum of the certainty factors of the matched characters is figured out, and the character with the largest sum (or the shortest distance) may be regarded as being matched. A plurality of sums of the certainty factors may be adopted from in descending order.

One or more queries are set in advance, and indexes corresponding to input video data are successively checked against the queries, and matching may be notified in synchronism with the recognition of the matching. As a result, this method can be used for an application for monitoring appearance of a specified text in a video.

An effect of the second embodiment of the present invention is described below.

In the second embodiment, in a situation that an index is coped from video data whose image feature is similar and is given to target video data, even when the target video data does not include information which is not appropriate as the index, correct search can be conducted. Therefore, omission of the search of video data can be reduced.

In as aspect in which ambiguity is left in an index, an ambiguous index is checked against the query, and thus a cyclopedic check can be conducted on all the recognition candidates. As a result, an influence of false recognition of characters due to the deterioration in the search accuracy can be reduced, so that the efficiency for selecting desired scenes can be further improved.

A third embodiment of the present invention is described in detail below with reference to the drawings.

The video data indexing system according to the third embodiment of the present invention presents video data or the like which are related to indexes matched with related indexes to the user according to video data specified by the user. Therefore, the video data indexing system according to the third embodiment can be called also as a video data searching system.

Figure 9:
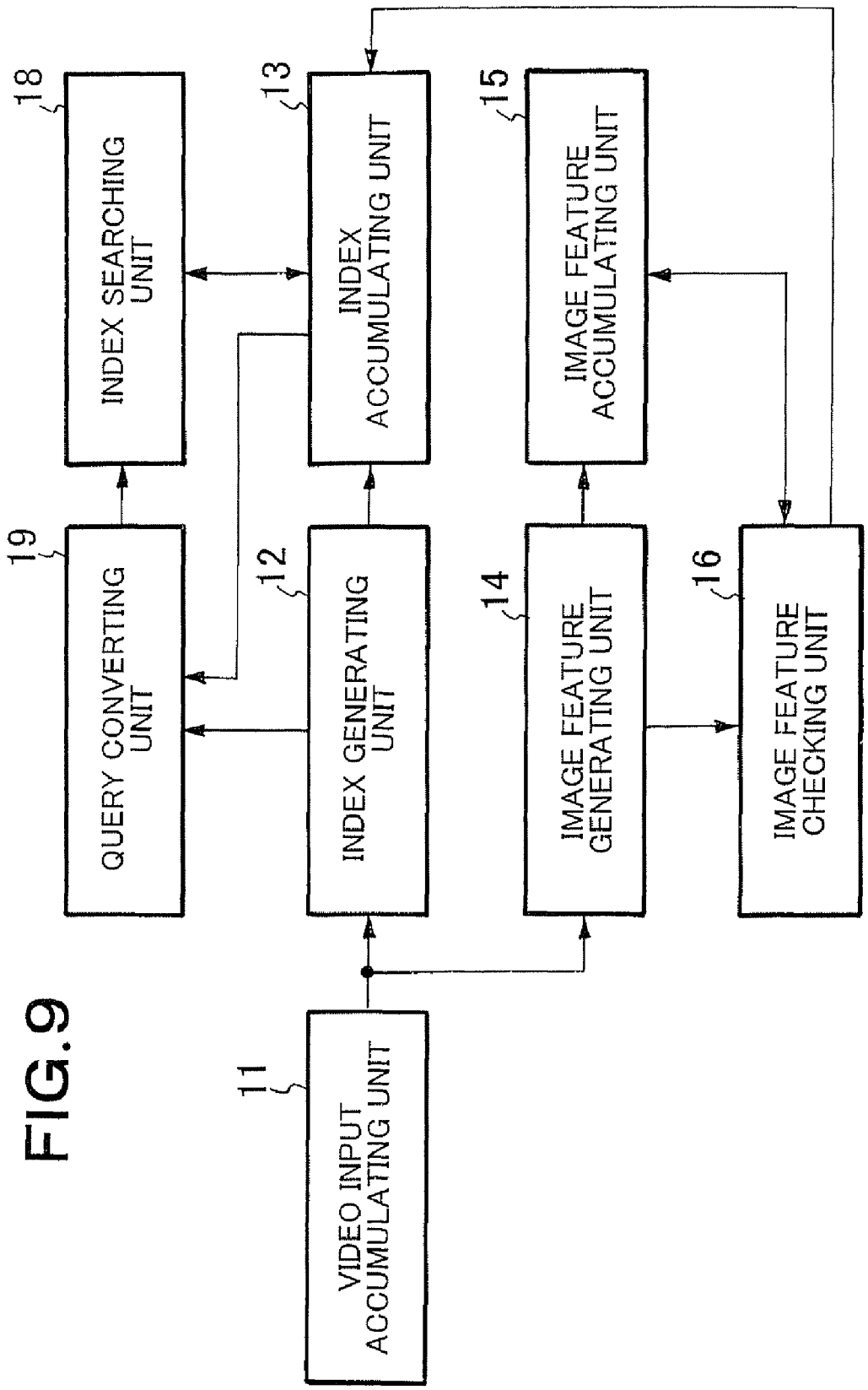
FIG. 9 is a block diagram illustrating the constitution according to the best mode for embodying a third invention of the present invention.

FIG. 9 is a block diagram illustrating the video data indexing system according to the third embodiment of the present invention. Components similar to those in the first and second embodiments are denoted by the same reference numerals in FIG. 1 or 8, and the description thereabout is omitted. As shown in FIG. 9, the video data indexing system according to the third embodiment has a video input accumulating unit 11, the index generating unit 12, the index accumulating unit 13, the image feature generating unit 14, the image feature accumulating unit 15, the image feature checking unit 16, the index searching unit 18 and a query converting unit 19.

That is to say, the third embodiment of the present invention is characterized by including the query converting unit 19 which outputs an index output from the index generating unit 12 at corresponding time as a query to the index searching unit 18, when video data at time specified by a user in receiving video data or the video data accumulated in the video input accumulating unit 11 is present to the user and the user specifies this presented video data as an image query.

When the specified video data is presented while the user is browsing the video, and a request for searching related video data is input based on the specified video data, the query converting unit 19 converts the index corresponding to the video data input from the index generating unit 12 or outputs it directly to the index searching unit 18.

As to the index conversion, in the example of FIG. 3, for example, most probable candidates may be arranged into "松田秀高", or recognition candidates corresponding to specified cut-out candidates with high certainty factor may be arranged into "木公口考豆". In this case, similarly to the query in the second embodiment, the index searching unit 18 checks the input and converted index against the accumulated indexes. When the index is output directly to the index searching unit 18, this index is called as an index query, and the matching between this index and the accumulated index may be recognized when the ratio of a number of characters of the input index query matched with the accumulated index to a number of recognition candidates included in the input index query exceeds a predetermined value. In another manner, the number of matched characters may be counted so that right-hand radical "公" of "松" is not simultaneously matched with a recognition candidate "畔" corresponding to a cutting-out candidate obtained by combining "公" and "甲", namely, positional incoherence does not occur. Similarly to the second embodiment, a certainty factor of the recognition candidates and a distance value may be added, or a plurality of matchings may be presented.

An effect of the third embodiment of the present invention is described below.

In the third embodiment of the present invention, since search may be conducted only by specifying certain video data, another video data related to the current video data can be easily taken out without user's input of a query.

Further, according to as aspect in which ambiguity is left in indexes, the indexes and index query with ambiguity can be checked. For this reason, the influence of the false recognition of characters due to the deterioration in the search accuracy can be reduced, and the efficiency for selecting desired scenes can be further improved.

In the third embodiment of the present invention, a corresponding index is acquired from video data specified by a user, and search is conducted based on the index. Therefore, even when it is difficult to relate a corresponding object to an image feature like a case where the object included in the specified video data is photographed under a different condition, when indexes are matched as to caption added as similar character information, the video data can be searched, and the deterioration in the search accuracy can be reduced.

According to the present invention, since video data which are related to each other due to the same indexes have a common image feature, photographed objects are expected to be identical to each other. Therefore, when an index is generated, both of the video data are stored as the identical objects, knowledge of the objects can be enhanced. That is to say, a system which has a function for storing names of people and thing based on character information can be realized.

The above embodiments describe character string included in the video data as Chinese characters (Kanji), but it goes without saying that the character string may include Hiragana and Katakana. Language of characters is not limited to Japanese, and characters of English, German, French, Italian and Korean may be used.

In the above embodiments, in the video data indexing system, the video input accumulating unit 11 is provided to the former stage of the index generating unit and the image feature generating unit, but the video input accumulating unit is additionally provided, and video data may be input into the index generating unit and the image feature generating unit without via the video input accumulating unit. Further, in FIGS. 7, 8 and 9, the outputs from the ambiguous index generating unit 17 and the index generating unit 12 are not input into the image feature checking unit 16, but similarly to FIG. 1, they may be input into the image feature checking unit 16.

Figure 10:
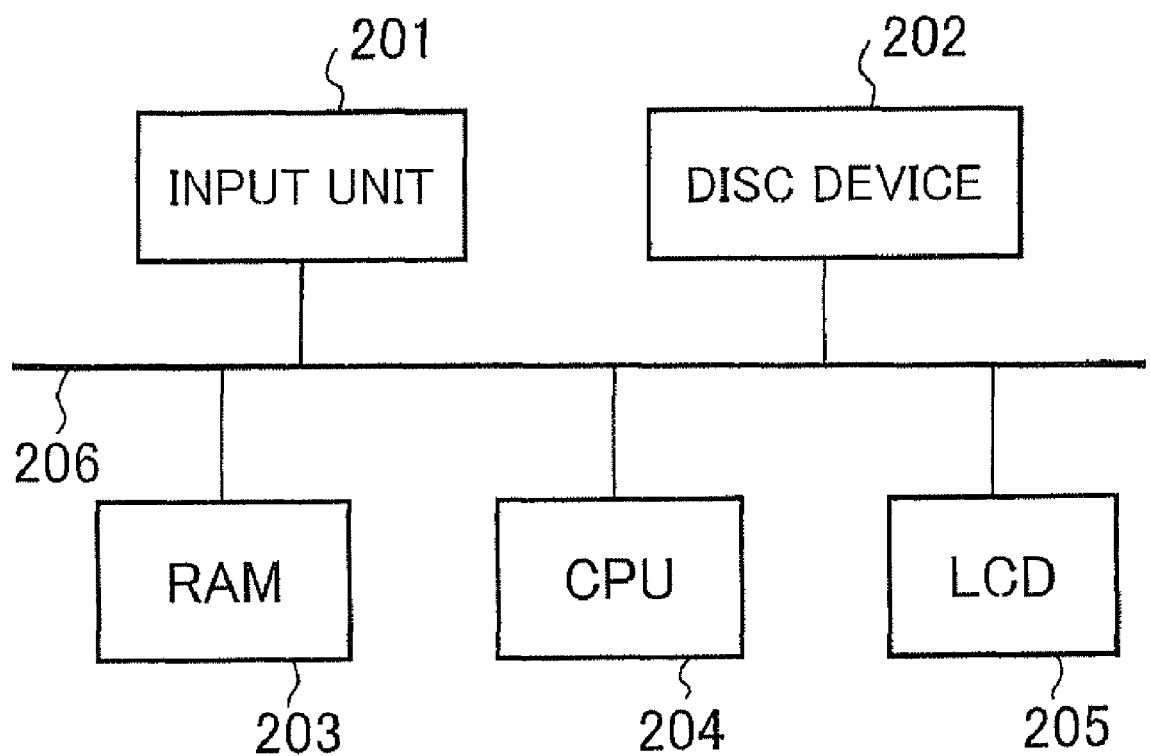
FIG. 10 is a block diagram illustrating a constitutional example of a computer composing a video data indexing system.

The video data indexing system described in the above embodiments can be composed of a computer shown in FIG. 10.

The video input accumulating unit 11, the index accumulating unit 13, and the image feature accumulating unit 15 are composed of storage portions such as a disc device 202 such as a hard disc. A CPU 204 realizes the functions of the index generating unit 12 or the ambiguous index generating unit 17, the image feature generating unit 14, the image feature checking unit 16, the index searching unit 18 and the query converting unit 19 described above, and executes the process based on a program where the respective functions are described (here the program is saved in the disc device 202). Particularly the function of the image feature checking unit is already described with reference to FIGS. 4, 5 and 6. In other word, the present invention is realized as a program product which is stored in the disc device to be the storage portion of the computer and has a code for allowing the computer to execute the functions of the video data indexing system. An LCD (liquid crystal display) 205 becomes a display unit on which an alarm or the like is displayed. Numeral "206" denotes a bus such as a data bus. Numeral "203" denotes a memory in which data necessary for the arithmetic process of the program is saved. Numeral "201" denotes an input unit such as a keyboard.

The program can be recorded in an information recording medium readable by a computer such as a semiconductor memory including FD (floppy disc), CDROM, DVD or flash memory. The program recorded in FD or CDROM is read into the storage portion such as the disc device 202 of the computer, and the process is executed so that the program can function as the video data indexing system. Further, the rights of present invention cover the program, and when the program is downloaded into the computer which functions as the video data indexing system via a communication line, the rights of present invention cover transmission and reception of the program. The functions of the index generating unit 12 or the ambiguous index generating unit 17, the image feature generating unit 14, the image feature checking unit 16, the index searching unit 18 and the query converting unit 19 of the video data indexing system can be realized by the software as the program, but can be realized also by hardware using dedicated ICs.

The typical embodiments of the present invention are described above, and the present invention may be embodied in other specific forms without departing from the spirit or essential characteristics thereof. For this reason, the embodiments are therefore to be considered in all respects as illustrative and not restrictive, and the scope of the invention is indicated by the appended claims rather than by the specification and abstract. All changes and modifications which come within the meaning and range of equivalency of the claims are therefore intended to be embraced therein.

Industrial Applicability

The present invention can be applied to a video recorder, a camcorder, a digital still camera, a mobile terminal device with image pickup and image receiving functions, such as mobile phone and PHS (Personal Handyphone System), personal computer, and PDA (Personal Data Assistance, Personal Digital Assistants Personal portable information communication device) mounted with a camera, and systems including them. The present invention can be applied to a system or the like which indexes a scene where a target object appears in a monitor system image.

The invention claimed is:
1. A video data indexing system comprising:
an index generating unit which generates an index from inputted video data;
an index accumulating unit which accumulates a plurality of the index which are related with a plurality of the inputted video data respectively;

an image feature generating unit which generates an image feature from the inputted video data;

an image feature accumulating unit which accumulates a plurality of the image feature which are related with a plurality of the inputted video data respectively; and an image feature checking unit which, when the image feature checking unit receives the index and the image feature of the inputted video data from the index generating unit and the image feature generating unit respectively, searches the image feature accumulating unit for an image feature which is matched with or similar to the received image feature, acquires an index related with the video data corresponding to the searched image feature from the index accumulating unit, adds the acquired index to the received index of the inputted video data, and accumulates the received index of the inputted video data which the acquired index is added, as the index of the inputted video data, in the index accumulating unit, wherein the index generating unit is an ambiguous index generating unit which extracts character information from a video and generates an ambiguous index including both of cut-out candidates and character recognition candidates acquired by recognizing characters, and the index accumulating unit is an ambiguous index accumulating unit which accumulates the ambiguous index.

2. The video data indexing system according to claim 1, further comprising:

a video accumulating unit which accumulates the video data; and an index searching unit which acquires a query of a text, acquires an index matched with the query from the index accumulating unit and acquires video data on the index position from the video accumulating unit.

3. The video data indexing system according to claim 2, further comprising a query converting unit which generates an index from specified video data in the inputted video data to be accumulated or accumulated in the video accumulating unit, and outputs the index as the query to the index searching unit.

4. A video data indexing system comprising:

an index generating unit which generates an index from inputted video data;

an index accumulating unit which accumulates a plurality of the index which are related with a plurality of the inputted video data respectively;

an image feature generating unit which generates an image feature from the inputted video data;

an image feature accumulating unit which accumulates a plurality of the image feature which are related with a plurality of the inputted video data respectively; and an image feature checking unit which, when the image feature checking unit receives the image feature of the inputted video data from the image feature generating unit, searches the image feature accumulating unit for an image feature which is matched with or similar to the received image feature, acquires an index related with the video data corresponding to the searched image feature from the index accumulating unit, adds the index of the inputted video data, which is received from an index accumulating unit, to the acquired index, and accumulates the acquired index which the received index of the inputted video data is added, as the index of the video data corresponding to the searched image feature, in the index accumulating unit, the index generating unit is an ambiguous index generating unit which extracts character information from a video and generates an ambiguous index including both of cut-out candidates and character recognition candidates acquired by recognizing characters, and the index accumulating unit is an ambiguous index accumulating unit which accumulates the ambiguous index.

5. The video data indexing system according to claim 4, further comprising:

a video accumulating unit which accumulates the video data; and an index searching unit which acquires a query of a text, acquires an index matched with the query from the index accumulating unit and acquires video data on the index position from the video accumulating unit.

6. The video data indexing system according to claim 5, further comprising a query converting unit which generates an index from specified video data in the inputted video data to be accumulated or accumulated in the video accumulating unit, and outputs the index as the query to the index searching unit.

7. A video data indexing method comprising:

an index generating step of causing an index generating unit to generate an index from inputted video data;

a first index accumulating step of causing an index accumulating unit to accumulate a plurality of the index which are related with a plurality of the inputted video data respectively;

an image feature generating step of causing an image feature generating unit to generate an image feature from the inputted video data;

an image feature accumulating step of causing an image feature accumulating unit to accumulate a plurality of the image feature which are related with a plurality of the inputted video data respectively;

an image feature checking step of causing an image feature checking unit, when the image feature checking unit receives the index and the image feature of the inputted video data from the index generating unit and the image feature generating unit respectively, to search an image feature matched with or similar to the received image feature from image features accumulated at the image feature accumulating step, and to acquire an index related with the video data, corresponding to the searched image feature, from the index accumulating unit; and a second index accumulating step of causing the image feature checking unit to add the acquired index to the received index of the inputted video data and causing the index accumulating unit to accumulate the received index of the inputted video data which the acquired index is added, as the index of the inputted video data;

a video accumulating step of accumulating the video data;

an index searching step of acquiring a query of a text, acquiring an index matched with the query, and acquiring video data on the index position from the video data accumulated at the video accumulating step;

a query converting step of generating an index from specified video data in the inputted video data to be accumulated or accumulated at the video accumulating step so as to use the index as the query, wherein the index generating step is an ambiguous index generating step of extracting character information from a video, and generating an ambiguous index including both of cut-out candidates and character recognition candidates acquired by recognizing characters, and the index accumulating step is an ambiguous index accumulating step of accumulating the ambiguous index.

8. A video data indexing method comprising:
- an index generating step of causing an index generating unit to generate an index from inputted video data;
- a first index accumulating step of causing an index accumulating unit to accumulate a plurality of the index which are related with a plurality of the inputted video data respectively;
- an image feature generating step of causing an image feature generating unit to generate an image feature from the inputted video data;
- an image feature accumulating step of causing an image feature accumulating unit to accumulate a plurality of the image feature which are related with a plurality of the inputted video data respectively;
- an image feature checking step of causing an image feature checking unit, when the image feature checking unit receives the image feature of the inputted video data from the image feature generating unit, to search an image feature matched with or similar to the received image feature from image features accumulated at the image feature accumulating step, and to acquire an index related with the video data, corresponding to the searched image feature, from the index accumulating unit; and
- a second index accumulating step of causing the image feature checking unit to add the index of the inputted video data, which is received from the index accumulating unit, to the acquired index and causing the image feature checking unit to accumulate the acquired index which the received index of the inputted video data is added, as the index of the video data corresponding to the searched image feature, wherein the index generating step is an ambiguous index generating step of extracting character information from a video, and generating an ambiguous index including both of cut-out candidates and character recognition candidates acquired by recognizing characters, and the index accumulating step is an ambiguous index accumulating step of accumulating the ambiguous index.

9. The video data indexing method according to claim 8, further comprising:
- a video accumulating step of causing a video accumulating unit to accumulate the video data; and
- an index searching step of causing an index searching unit to acquire a query of a text, to acquire an index matched with the query, and to acquire video data on the index position from the video data accumulated at the video accumulating step.

10. The video data indexing method according to claim 9, further comprising a query converting step of causing a query converting unit to generate an index from specified video data in the inputted video data to be accumulated or accumulated at the video accumulating step so as to use the index as the query.

11. A non-transitory computer-readable memory that stores a video data indexing program which allows a computer to function as:
- an index generating unit which generates an index from inputted video data;
- an index accumulating unit which accumulates a plurality of the index which are related with a plurality of the inputted video data respectively;
- an image feature generating unit which generates an image feature from the inputted video data;
- an image feature accumulating unit which accumulates a plurality of the image feature which are related with a plurality of the inputted video data respectively; and
- an image feature checking unit which, when the image feature checking unit receives the index and the image feature of the inputted video data from the index generating unit and the image feature generating unit respectively, searches the image feature accumulating unit for an image feature which is matched with or similar to the received image feature, acquires an index related with the video data corresponding to the searched image feature from the index accumulating unit, adds the acquired index to the received index of the inputted video data, and accumulates the received index of the inputted video data which the acquired index is added, as the index of the inputted video data, in the index accumulating unit, wherein the index generating unit is an ambiguous index generating unit which extracts character information from a video and generates an ambiguous index including both of cut-out candidates and character recognition candidates acquired by recognizing characters, and the index accumulating unit is an ambiguous index accumulating unit which accumulates the ambiguous index.

12. The video data indexing program according to claim 11, which further allows the computer to function as:
- a video accumulating unit which accumulates the video data; and
- an index searching unit which acquires a query of a text, acquires an index matched with the query from the index accumulating unit and acquires video data on the index position from the video accumulating unit.

13. The video data indexing program according to claim 12, which further allows the computer to function as a query converting unit which generates an index from specified video data in the inputted video data to be accumulated or accumulated in the video accumulating unit, and outputs the index as the query to the index searching unit.

14. A non-transitory computer-readable memory that stores a video data indexing program which allows a computer to function as:
- an index generating unit which generates an index from inputted video data;
- an index accumulating unit which accumulates a plurality of the index which are related with a plurality of the inputted video data respectively;
- an image feature generating unit which generates an image feature from the inputted video data;
- an image feature accumulating unit which accumulates a plurality of the image feature which are related with a plurality of the inputted video data respectively; and
- an image feature checking unit which, when the image feature checking unit receives the image feature of the inputted video data from the image feature generating unit, searches the image feature accumulating unit for an image feature which is matched with or similar to the received image feature, acquires an index related with the video data corresponding to the searched image feature from the index accumulating unit, adds the index of the inputted video data, which is received from an index accumulating unit, to the acquired index, and accumulates the acquired index which the received index of the inputted video data is added, as the index of the video data corresponding to the searched image feature, in the index accuaccumulating unit, wherein the index generating unit is an ambiguous index generating unit which extracts character information from a video and generates an ambiguous index including both of cut-out candidates and character recognition candidates acquired by recognizing characters, and the index accumulating unit is an ambiguous index accumulating unit which accumulates the ambiguous index.

15. The video data indexing program according to claim 14, which further allows the computer to function as:

a video accumulating unit which accumulates the video data; and an index searching unit which acquires a query of a text, acquires an index matched with the query from the index accumulating unit and acquires video data on the index position from the video accumulating unit.

16. The video data indexing program according to claim 15, which further allows the computer to function as a query converting unit which generates an index from specified video data in the inputted video data to be accumulated or accumulated in the video accumulating unit, and outputs the index as the query to the index searching unit.

* * * * *

UNITED STATES PATENT AND TRADEMARK OFFICE
CERTIFICATE OF CORRECTION

| | |
|---|---|
| PATENT NO. | : 8,280,195 B2 |
| APPLICATION NO. | : 12/294220 |
| DATED | : October 2, 2012 |
| INVENTOR(S) | : Noboru Nakajima |

It is certified that error appears in the above-identified patent and that said Letters Patent is hereby corrected as shown below:

In the Drawings
Drawing Sheet 3 of 9, Box S92: Delete "IMGE" and insert -- IMAGE --
Drawing Sheet 3 of 9, Box S93: Delete "IMGE" and insert -- IMAGE --
Drawing Sheet 3 of 9, Box S102: Delete "IMGE" and insert -- IMAGE --
Drawing Sheet 3 of 9, Box S103: Delete "IMGE" and insert -- IMAGE --
Drawing Sheet 3 of 9, Box S107: Delete "FEATRE" and insert -- FEATURE --

In the Specification
Column 7, Line 11-12: Delete "(step S101)," and insert -- (step S105), --
Column 9, Line 19: Delete "descried" and insert -- described --
Column 12, Line 55: Delete "Assistants" and insert -- Assistants: --

In the Claims
Column 16, Line 62: Claim 14, delete "accuaccumulating" and insert -- accumulating --

Signed and Sealed this
Twenty-first Day of October, 2014

Michelle K. Lee
*Deputy Director of the United States Patent and Trademark Office*